United States Patent [19]

Hattori et al.

[11] Patent Number: 5,164,430
[45] Date of Patent: Nov. 17, 1992

[54] ACRYLIC, URETHANATED EPOXY AND PARTICULATE AMINE-EPOXY/POLYBUTADIENE CATIONIC RESINS

[75] Inventors: Tsutomu Hattori; Hirofumi Masui; Katsuo Iizuka; Satoru Nishigaki, all of Zama; Shinichi Hashimoto; Kiyoshi Taki, both of Amagasaki, all of Japan

[73] Assignee: Nissan Motor Co., Ltd., Amagasaki, Japan

[21] Appl. No.: 565,830

[22] Filed: Aug. 13, 1990

[30] Foreign Application Priority Data

Aug. 14, 1989 [JP] Japan .................. 1-207826

[51] Int. Cl.$^5$ .................. C08K 3/22; C08K 5/06; C08K 5/09; C08L 33/14
[52] U.S. Cl. .................. 523/429; 523/404; 523/428; 525/111; 525/63; 428/418
[58] Field of Search .................. 523/404, 428, 429; 525/63, 111

[56] References Cited

U.S. PATENT DOCUMENTS

| | | | |
|---|---|---|---|
| 4,579,886 | 4/1986 | Otsuki et al. | 523/404 |
| 4,879,325 | 11/1989 | Kimura et al. | 523/417 |
| 5,075,165 | 12/1991 | Kishi et al. | 428/331 |

FOREIGN PATENT DOCUMENTS

| | | |
|---|---|---|
| 0259181 | 3/1988 | European Pat. Off. |
| 0261385 | 3/1988 | European Pat. Off. |
| 64-93024 | 7/1979 | Japan |
| 59-129270 | 7/1984 | Japan |
| 61-44906 | 10/1986 | Japan |
| 63-39972 | 2/1988 | Japan |
| 63-62897 | 3/1988 | Japan |
| 63-63761 | 3/1988 | Japan |

Primary Examiner—Robert E. Sellers

[57] ABSTRACT

A cationic electrodeposition paint composition suitable to be coated on a road wheel of an automotive vehicle. The paint composition is composed of an acrylic cationic resin (A), a urethanated epoxy cationic resin (B) a hardner resin (C) of a blocked isocyanate, and a cationic cross-linked resin particulate (D) having an average particle size ranging from $0.01\mu$ to $1\mu$. In the paint composition the acrylic cationic resin (A), the urethanated epoxy system cationic resin (B), the blocked isocyanate hardner resin (C) and the cationic cross-linked resin particulate are respectively in amount of 20 to 70 parts by weight, 5 to 50 parts by weight, 10 to 40 parts by weight and 1 to 20 parts by weight relative to 100 parts by weight of a total solid content of the resins and particulate (A), (B), (C) and (D), thereby improving the corrosion resistance of the paint composition to the cut edge portion of the road wheel and the weatherability of coated paint film.

25 Claims, 1 Drawing Sheet

FIG.1

ACRYLIC, URETHANATED EPOXY AND PARTICULATE AMINE-EPOXY/POLYBUTADIENE CATIONIC RESINS

BACKGROUND OF THE INVENTION

1. Field of the Invention

This invention relates to improvements in a cationic electrodeposition paint composition, and more particularly to a cationic electrodeposition paint composition which is high in an ability for covering an edge portion of a metal plate and high in weatherability.

2. Description of the Prior Art

Hitherto a cationic electrodeposition paint has been prepared by neutralizing a variety of basic resins such as basic epoxy resin, acrylic resin and polyurethane resin with organic acids, and followed by diluting it with water. In order to accomplish an electrodeposition painting, a metal object (such as steel plate) to be coated with a paint is dipped in the cationic electrodeposition paint and serves as cathode. Upon passing direct current through the metal object, a paint film which is insoluble in water is deposited on the surface of the metal object and thereafter baked to be hardened. Such an electrodeposition painting have been extensively used in industry to obtain a coated paint film which is high in weatherability and appearance while providing a corrosion resistance to the metal object. Additionally, a variety of compositions for such an electrodeposition paint have been proposed.

The cationic electrodeposition paint usually includes as a main component a cationic resin derived from an epoxy resin (referred hereinafter to as "epoxy cationic resin") or a cationic resin derived from an acrylic resin (referred hereinafter to as "acryl cationic resin". The electrodeposition paint including the former epoxy cationic resin is excellent in corrosion resistance to the metal object (steel plate) coated with the paint but inferior in weatherability. On the contrary, the electrodeposition paint including the latter acrylic cationic resin is excellent in weatherability but inferior in the corrosition resistance to the metal object (steel plate) to be coated with the paint. Such a fact has been known in the art.

In order to achieve both a high weatherability and a high corrosion resistance to the metal object, a cationic electrodeposition paint composition including both the epoxy cationic resin and the acryl cationic resin has been proposed as disclosed, for example, in Japanese Patent Publication No. 61-44906, and a Japanese technical magazine "The Industrial Coating" (by Toryo Hochi Shinbunsha) No. 87, Pages 38, published on Jul. 15, 1987 and No. 95, Page 42, Nov. 15, 1988. However, these publications are silent in improving an ability for covering the edge portion of the metal object (steel plate).

In this regard, it is effective for improving the edge portion covering ability, to control the rhelogy of a molten coated paint film in a baking step, in which the melt viscosity is raised to lower the surface tension. As a measure for controlling the rheology, using a pigment having a large oil absorping ability has been proposed as disclosed for example in Japanese Patent Provisional Publication No. 63-62897. As another measure for the same purpose, using cross-linked resin particulate (so-called micro-gel) has been proposed as disclosed for example in Japanese Patent Provisional Publication No. 63-63761 and the Japanese technical magazine "The Industrial Coating" No. 95, pages 33 to 35. However, with even such measures, the weatherability and the edge portion covering ability (the corrosion resistance to the edge portion of the metal object) cannot be satisfied.

SUMMARY OF THE INVENTION

It is an object of the present invention to provide an improved cationic electrodeposition paint composition which is very high in the edge portion covering ability and in weatherability while securing a high corrosion resistance to a flat part of a metal object to be coated.

A cationic electrodeposition paint composition according to the present invention is comprised of an acrylic (acrylic resin) cationic resin (A) which is a copolymer of a first vinyl monomer having at least one of secondary and tertiary amino groups, a second vinyl monomer having a hydroxyl group, and a third vinyl monomer other than the first and second vinyl monomers; a urethanated epoxy cationic resin (B) which is a reaction product between a urethanated epoxy resin and at least one of primary and secondary amines; a hardener resin (C) of a blocked isocyanate which regenerates isocyanate group by its thermal decomposition under heating; and a cationic cross-linked resin particulate (D) which is an addition reaction product between an epoxy resin derivative (d-1) having not less than two primary amine groups in one molecule and a polybutadiene derivative (d-2) having not less than two $\alpha,\beta$-ethylenic unsaturated groups in a molecule, the resin particulate having an average particle size ranging from $0.01\mu$ to $1\mu$. In the above cationic electrodeposition paint composition, the acrylic cationic resin (A) is in an amount ranging from 20 to 70 parts by weight relative to 100 parts by weight of a total solid content of the acrylic cationic resin (A), the urethanated epoxy cationic resin (B), the hardener resin (C) and the cationic cross-linked resin particulate (D). The urethane-modified epoxy cationic resin (B) is in an amount ranging from 5 to 50 parts by weight relative to 100 parts by weight of the total solid content. The hardener resin (C) is in an amount ranging from 10 to 40 parts by weight relative to 100 parts by weight of the total solid content. The cationic cross-linked resin particulate (D) is in an amount ranging from 1 to 20 parts by weight relative to 100 parts by weight of the total solid content.

Accordingly, the cationic electrodeposition paint composition of the present invention can provide a paint film coated on the surface of a steel plate, which is high in the edge portion covering ability to improve a corrosion resistance to the steel plate while being highly improved in weatherability. The paint composition of the present invention is particularly advantageous for use in a road wheel of an automotive vehicle which is used under a severe condition.

BRIEF DESCRIPTION OF THE DRAWING

The single figure.

DETAILED DESCRIPTION OF THE INVENTION

According to the present invention, a cationic electrodeposition paint composition is comprised of an acrylic cationic resin (A) which is a copolymer of a first vinyl monomer having at least one of secondary and tertiary amino groups, a second vinyl monomer having a hydroxyl group, and a third vinyl monomer other than the first and second vinyl monomers; a urethanated epoxy cationic resin (B) which is a reaction product between a urethanated epoxy resin and at least one of primary and secondary amines; a hardener resin (C) of a blocked isocyanate which regenerates isocyanate group by its thermal decomposition under heating; and a cationic cross-linked resin particulate (D) which is an addition reaction product between an epoxy resin derivative (d-1) having not less than two primary amine groups in one molecule and a polybutadiene derivative (d-2) having not less than two $\alpha,\beta$-ethylenic unsaturated groups in a molecule, the resin particulate having an average particle size ranging from $0.01\mu$ to $1\mu$. In the above cationic electrodeposition paint composition, the acrylic cationic resin (A) is in an amount ranging from 20 to 70 parts by weight relative to 100 parts by weight of a total solid content of the acrylic cationic resin (A), the urethanated epoxy cationic resin (B), the hardener resin (C) and the cationic cross-linked resin particulate (D). The urethanated epoxy cationic resin (B) is in an amount ranging from 1 to 50 parts by weight relative to 100 parts by weight of the total solid content. The hardener resin (C) is in an amount ranging from 10 to 40 parts by weight relative to 100 parts by weight of the total solid content. The cationic cross-linked resin particulate (D) is in an amount ranging from 1 to 20 parts by weight relative to 100 parts by weight of the total solid content.

The above-mentioned acrylic cationic resin (A) as a component of the electrodeposition paint composition is a cationic resin derived from an acrylic resin and produced by copolymerization of the first vinyl monomer having secondary and/or tertiary amino group, the second vinyl monomer having the hydroxyl group, and other vinyl monomer (monomers) other than the first and second vinyl monomers.

Examples of the first vinyl monomer having the amino group are dialkyl aminoalkyl (meth)acrylates such as dimethyl amonoethyl (meth)acrylate, diethyl aminoethyl (meth)acrylate, dimethyl aminopropyl (meth)acrylate and diethyl aminopropyl (meth)acrylate; N-dialkyl aminoalkyl (meth)acrylamides such as N-dimethyl aminoethyl (meth)acrylamide, N-diethyl aminoethyl (meth)acrylamide, N-dimethyl aminopropyl (meth)acrylamide and N-diethyl aminopropyl (meth)acrylamide; t-butyl aminoethyl (meth)acrylate; t-butyl aminopropyl (meth)acrylate; aziridinyl ethyl (meth)acrylate; pyrrolidinyl ethyl (meth)acrylate; and piperidinyl ethyl (meth)acrylate.

Of the above-exemplified monomers, dialkyl aminoalkyl (meth)acrylates and/or N-dialkyl aminoalkyl (meth)acrylamides are preferably used for the first vinyl monomer having the amino group from the point of view of hardening characteristics.

The first vinyl monomer having the amino group serves to provide a cationic group to a produced copolymer. The first vinyl monomer is preferably used in an amount ranging from 5 to 40 parts by weight relative to 100 parts by weight of the total of all the vinyl monomers (the first, second and third monomers) used in production of the copolymer. If the amount of the first vinyl monomer is less than 5 parts by weight, water-reducibility of a paint composition after neutralization with organic acid is insufficient thereby making difficult to obtain a stable paint composition. If the amount of the first vinyl monomer exceeds 40 parts by weight, a large amount of gas is generated owing to electrolysis during the electrodeposition painting, thereby causing defects of the coated paint film such as pin-holes and/or remelting of the paint film, while degrading a water resistance of the coated paint film and a corrosion resistance to the metal object (steel plate) to be coated with the paint composition.

Examples of the second vinyl monomer having the hydroxyl group are hydroxyl group-containing methacrylate esters such as 2-hydroxyethyl (meth)acrylate, 2-hydroxypropyl (meth)acrylate, 2-hydroxybutyl (meth)acrylate and 4-hydroxybutyl (meth)acrylate.

The second vinyl monomer serves to provide hydroxyl group to the produced copolymer and makes a hardening reaction with the regenerated isocyanate groups from the blocked isocyanate hardener resin (C) in a baking step of the coated paint film thereby to secure a high quality in coated paint film. The second vinyl monomer is used preferably in an amount ranging from 5 to 50 parts by weight relative to 100 parts by weight of the total of all the vinyl monomers (the first, second and third vinyl monomers), which is determined by taking account of a OH/NCO ratio or hardening reactivity of the paint composition under a baking condition, adhesion of the coated paint film to the steel plate, water resistance of the coated paint film, corrosion resistance to the steel plate and a variety of physical properties of the coated paint film, thereby obtaining a quality in which the above-listed characteristics are well balanced.

The above-mentioned other (third) vinyl monomer (monomers) is a vinyl monomer which is copolymerizable with the above-mentioned first and second monomers. Examples of the other (third) monomer are (meth)acrylate esters such as methyl (meth)acrylate, ethyl (meth)acrylate, n-propyl (meth)acrylate, isopropyl (meth)acrylate, n-butyl (meth)acrylate, isoburyl (meth)acrylate, t-butyl (meth)acrylate, 2-ethylhexyl (meth)acrylate, lauryl (meth)acrylate, cyclohexyl (meth)acrylate, and benzyl (meth)acrylate; amide group-containing monomers such as (meth)acrylamide, N, N-dimethyl (meth)acrylamide, and N-alkoxymethyl (meth)acrylamide; aromatic vinyl monomers such as styrene, vinyl toluene, and $\alpha$-methyl styrene. Such a monomer (third monomer) is used to control the appearance, weatherability, hardness, water resistance and various physical properties of the coated paint film.

Copolymerization of the first, second and the other (third) monomers is carried out, as usual, in a suitable solvent using a radical copolymerization initiator. In the copolymerization, a chain transfer agent may be used to carry out a suitable control of molecular weight of a resultant copolymer, if necessary.

The above-mentioned urethanated epoxy cationic resin (B) as a component of the electrodeposition paint composition is a cationic resin derived from the urethanated epoxy resin and produced by amination of a reaction product obtained by a reaction between urethane prepolymer containing two end-isocyanate groups and an epoxy resin. The isocyanate group containing urethane prepolymer is obtained by a reaction between a diol and a diisocyanate which are theoretically 1:2 in mol ratio.

Examples of the diol are monoether and polyether glycols such as ethylene glycol, propylene glycol, diethylene glycol, tripropylene glycol, polyethylene glycol, polypropylene glycol; diphenol compounds such as bis (4'-hydroxyphenyl) methane, 1, 1-bis (4'-hydroxyphenyl) ethane, 2, 2-bis (4'-hydroxyphenyl) propane, cresol and resorcinol; and diols which are obtained by addition polymerization of ethylene oxide and/or propylene oxide with alicyclic diols, such as bis (4'-hydroxycyclohexyl) methane, and 1, 1-bis (4'-hydroxycyclohexyl) ethane, a molecule of the diols having aromatic and/or aliphatic ring.

Examples of the diisocyanate are aliphatic diisocyanates such as tetramethylene diisocyanate and hexamethylene diisocyanate; cycloalkylene diisocyanate such as 1, 4-cyclohexane diisocyanate and isophorone diisocyanate; and aromatic or aromatic-aliphatic diisocyanates such as m-phenylene diisocyanate, 4, 4-diphenylmethane diisocyanate and 2, 4- or 2, 6-tolylene diisocyanate.

The diol and the isocyanate are reacted with each other theoretically in a mol ratio of 1:2 directly or in the presence of a solvent which is inactive to the isocyanate, thereby producing a urethane prepolymer having isocyanate groups at the both ends of the prepolymer. Thereafter, the urethane prepolymer is reacted with an epoxy resin at a temperature of 60° C. to 150° C. directly or in the presence of a solvent which is inactive to the isocyanate, thereby obtaining the urethanated epoxy resin.

Used as the epoxy resin are all ones which are known per se and have 1.5 to 3.0 epoxy groups and preferably 2 epoxy groups per one molecule and has not less than 1 hydroxyl group. It is more preferable that the epoxy resin is a polyglycidyl ether of a polyphenol having at least two phenolic hydroxyl groups per one molecule on an average. The polyglycidyl glycidyl ether is produced by etherification with an epihalohydrin such epichlorohydrin in a known manner in the presence of alkali and has an average molecular weight ranging from 350 to 3000.

Examples of the polyphenol are bis (4'-hydroxyphenyl) methane, 1, 1 bis (4-hydroxyphenyl) ethane, 2, 2-bis (4-hydroxyphenyl) propane, 4-dihydroxy benzophenone, and 1, 5-dihydroxy naphthalene.

Other examples of the epoxy resin are aliphatic epoxy resin, novolak epoxy resin and polyalkylene glycol epoxy resin.

The above-mentioned urethanated epoxy resin is reacted with the amine thereby producing the urethanated epoxy cationic resin (B) which is a component of the cationic electrodeposition paint composition.

Examples of the amine are dialkyl amines such as diethyl amine, dibutyl amine, diisopropyl amine and di-n-propyl amine; alkylalkanol amines such as diethanol amine, diisopropanol amine and methylethanol amine; diamines such as dimethyl aminopropyl amine, diethyl aminoethyl amine, diethyl aminopropyl amine, monomethyl aminoethyl amine and hexamethylene diamine; triamines such as tetramethylene triamine, tetraethylene triamine; and cyclic amines such as piperidine and morpholine.

The reaction between the above-mentioned urethanated epoxy resin and the above-mentioned amine are carried out at a temperature ranging from room temperature to 150° C. directly or in the presence of a suitable solvent, in which the amine is in such an amount as to be 0.8 to 1.0 equivalent relative to the epoxy group. In this reaction, bibasic acids such as adipic acid and azelaic acid, polyether diol, polycaprolactone diol and/or the like may be reacted with the epoxy group, if necessary.

The blocked isocyanate hardener resin (C) of a component of the cationic electrodeposition paint composition may be any polyisocyanate resin which is a reaction product between isocyanate group and some kinds of compounds and stable to active hydrogen of hydroxyl group or amino group at room temperature; however, thermally decomposed at a high temperature (usually 80° C. to 250° C.) to regenerate isocyanate group so as to be reactive to the active hydrogen.

The blocked isocyanate hardener resin is prepared by using a suitable any organic polyisocyanate. Such an organic polyisocyanate are produced from isocyanate whose examples are aliphratic isocyanates such as trimethylene diisocyanate, tetramethylene diisocyanate and hexamethylene diisocyanate; cycloalkylene isocyanates such as 1, 4-cyclohexane diisocyanate, 1, 2-cyclohexane diisocyanate and isophorone diisocyanate; aromatic isocyanates such as m-phenylene diisocyanate, and 1, 4-naphthalene diisocyanate; aromatic-aliphatic isocyanates such as 4, 4-diphenylmethane diisocyanate, 2, 4- or 2, 6 -tolylene diisocyanate, 4, 4'-toluidine diisocyanate and and 1, 4-xylylene diisocyanate; nuclear substitution aromatic isocyanates such as dianisidine isocyanate, 4, 4-diphenylether diisocyanate and chlorodiphenylene diisocyanate; triisocyanates such as triphenylmethane-4, 4', 4"-triisocyante, 1, 3, 5-triisocyanate benzene, and 2, 4, 6-triisocyanate toluene; tetraisocyanates such as 4, 4'-diphenyl-dimethylmethane-2, 2'-5', 5'-tetraisocyanate; and polymerized polyisocyanates such as dimers and trimers of the above-mentioned diisocyanates.

Additionally, the organic polyisocyanate may be a prepolymer derived from a polyol which reacts with excessive isocyanates to provide an isocyanate-terminated prepolymer. The polyol is polyether polyol and/or polyester polyol containing polyether. The polyol may be a simple polyol whose examples are glycols such as ethylene glycol, propylene glycol, glycerin, trimethylol propane, hexane triol, pentaerythritol; and monoethers and polyethers such as diethylglycol and tripropylene glycol (i.e., alkylene oxide condensation products of the above-mentioned compounds).

The alkylene oxides which make condensation with the polyols are ethylene oxide, propylene oxide, butylene oxide, stylene oxide or the like. These are, in general, called hydroxy-terminated polyethers and may be of a straight chain type or a branched chain type. Examples of the polyether are polyoxyethylene glycol having a molecular weight of 1540, polyoxypropylene glycol, polyoxytetramethylene glycol, polyoxyhexamethylene glycol, polyoxynonamethylene glycol, polyoxydecamethylene glycol, polyoxydodecamethylene glycol and a mixture of the above-mentioned glycols. Polyoxyalkylene glycol ethers of the other types may be used as the polyether.

Examples of particularly useful polyether polyols are ethylene glycol, diethylene glycol, triethylene glycol, 1, 4-butylene glycol, 1, 3-butylene glycol, 1, 6-hexane diol, a mixture of the above-mentioned glycols, glycerin-trimethylol ethane, trimethylol propane, 1, 2, 6-hexane triol, pentaerythritol, dipentaerythritol, tripentaerythritol, polypentaerythritol, sorbitol, methylglycosides, and compounds which are produced by reaction of a polyol such as sucrose and alkylen oxide such as ethylene oxide, propylene oxide and a mixture thereof.

Examples of a blocking agent for the above-mentioned isocyanate are aliphatic alcohols such as methyl alcohol, ethyl alcohol, chloroethyl alcohol, propyl alcohol, butyl alcohol, amyl alcohol, hexyl alcohol, heptyl alcohol, octyl alcohol, nonyl alcohol, 3, 3, 5-trimethyl hexanol, decyl alcohol, lauryl alcohol; alicyclic alcohols such as phenylcarbinol and methylphenylcarbinol; monoalcohols of hydroxy group-containing vinyl compound or the like, such as 2-hydroxyethyl acrylate and 2-hydroxyethyl metacrylate; hydroxyl amines such as N, N-dimethylethanol amine and N, N-diethylethanol amine; oximes such as methylethyl ketone oxime, acetone oxime, cyclohexanone oxime; and lactams such as δ-caprolactam.

The blocked isocyanate hardener resin (C) is prepared by reacting the blocking agent with the isocyanate and isocyanate free radical, in which the blocking agent is in an amount sufficient to fully o react with the isocyanate and isocyanate free radical.

The above-mentioned cationic cross-linked resin particulate (D) is the addition reaction product formed by the addition reaction between the epoxy resin derivative (d-1) having not less than two primary amine groups in one molecule and the polybutadiene derivative (d-2) having not less than two $\alpha,\beta$-ethylenic unsaturated groups in a molecule. The average particle size of the cationic cross-linked resin particulate is within the range from $0.01\mu$ to $1\mu$. The epoxy resin derivative (d-1) is a derivative from an epoxy resin and has not less than two primary amine groups in one molecule. The derivative (d-1) is produced as follows: A dehydration condensation reaction is made between an amine compound (a) having not less than one secondary amine and not less than one primary amine, and a ketone compound (b), thereby producing a ketimine compound (c). Then, an addition reaction is made between the ketimine compound (c) and an epoxy resin (d) to produce a reaction product. Thereafter, the reaction product is subjected to hydrolysis thereby to regenerate primary amine group. The epoxy resin derivative and its production method mentioned above are disclosed for example in Japanese Patent provisional Publication Nos. 54-93024 and 59-129270.

Examples of the above-mentioned amine compound (a) are monoalkyl aminoalkylamines such as monomethyl aminoethylamine, monoethyl aminoethylamine, monomethyl aminopropylamine and monoethyl aminopropylamine; and polyalkylene polyamine such as diethylene triamine, dibutylene triamine and triethylene tetramine.

Examples of the above-mentioned ketone compound are acetone, methylethyl ketone, methylisobutyl ketone, methylpropyl ketone and cyclohexanone.

The above-mentioned polybutadiene derivative (d-2) is a derivative from the epoxidated polybutadiene and has not less than two $\alpha, \beta$-ethylenic unsaturated groups in one molecule of the derivative. It is preferable that the polybutadiene derivative (d-2) further has tertiary amine group in order to further improve the stability (in water) of the reaction product formed between it and the epoxy derivative (d-1). The polybutadiene derivative (d-2) can be produced by reacting a polybutadiene having not less than two oxirane groups with $\alpha,\beta$-ethylenic unsaturated carboxylic acid, or by reacting the polybutadiene with the carboxylic acid after reaction with secondary amine, as disclosed for example in Japanese Patent Provisional Publication No. 63-39972. Otherwise, the polybutadiene derivative (d-2) may be produced by reacting a reaction product of diisocyanate compound and hydroxyl group-containing $\alpha,\beta$-ethylenic unsaturated compound (1:1 in mol ratio), with an epoxidated polybutadiene to which secondary amine is added. It is preferable that the epoxidated polybutadiene has a number average molecular weight ranging from 500 to 10000, unsaturated double bonds corresponding to an iodine value ranging from 50 to 500, and oxirane oxygen in an amount ranging from 3 to 12% by weight.

As a typical compound serving to introduce $\alpha$, $\beta$-ethylenic unsaturated groups, (meth)acrylic acid and hydroxyethyl (meth)acrylate are exemplified.

Typical examples of the secondary amine are aliphatic amines such as dimethyl amine and diethyl amine; and alkanol amines such as methylethanol amine and diethanol amine.

The addition reaction between the epoxy resin derivative (d-1) and the polybutadiene derivative (d-2) is carried out as follows: The both derivatives (d-1) and (d-2) are mixed to form a mixture to which solvent such as alcohol, ester and/or ketone and organic acid such as formic acid, acetic acid and/or lactic acid are added. Subsequently, the mixture is heated at about 40° to 100° C. under vigorous stirring to accomplish a partial addition reaction between the derivatives (d-1) and (d-2). Thereafter, water or an aqueous dilution liquid containing the acrylic cationic resin (A), the urethanated epoxy cationic resin (B) and the blocked isocyanate hardener resin (C) is added to the mixture. Then, the m is heated at about 40° to about 80° C. thereby promoting the addition reaction between the derivatives (d-1) and (d-2) so as to accomplish cross-linking within a particle of the resin, thus forming the cationic cross-linked resin particulates. It will be understood that a suitable selection is made on the degree (gellation degree) of cross-linking within each particle, kind and amount of the solvent, concentration of neutralizing agent, degree of stirring, temperature and time of reaction and adding rate of water or the aqueous dilution liquid.

It is preferable that the average particle size of the cationic cross-linked resin particulate is within a range from $0.01\mu$ to $1\mu$. If the average particle size exceeds $1\mu$, it is difficult to obtain a stable aqueous dispersion liquid. If the average particle size is smaller than $0.01\mu$, an effect for suppressing flowability of the molten paint film during baking is insufficient at the edge portion of the metal object (steel plate) to be coated with the paint composition, thereby degrading the edge portion covering ability.

The blended amount (in solid content) of the acrylic cationic resin (A) in the cationic electrodeposition paint composition is within the range from 20 to 70 parts by weight, preferably 40 to 60 parts by weight, relative to 100 parts by weight of the total solid content of the resin (A), the resin (B), the resin (C) and the resin particulate (D). The blended amount (in solid content) of the urethanated epoxy cationic resin (B) is within the range from 5 to 50 parts by weight, preferably 10 to 30 parts by weight, relative to 100 parts by weight of the total solid content. The blended amount (in solid content) of the blocked isocyanate hardener resin (C) is within the range from 10 to 40 parts by weight, preferably 15 to 30 parts by weight, relative to 100 parts by weight of the total solid content. The blended amount (in solid content) of the cationic cross-linked resin particulate (D) is within the range from 1 to 20 parts by weight, preferably 3 to 15 parts by weight, relative to 100 parts by weight of the total solid content. The blended amount ratio among the resin (A), the resin (B), the resin (C) and the resin particulate (D) are decided to be within the above-mentioned ranges depending upon the specific compositions of the respective resins, the weatherability of the paint, the corrosion resistance of the paint to the flat surface and to the edge portion of the metal object (steel plate), and other requirements in quality of the paint.

In this regard, increasing the blended amount of the acrylic cationic resin (A) improves a weatherability, a yellowing resistance, a gloss of a resultant coated paint film, but degrades a corrosion resistance of the paint of the flat part of the metal object (steel plate) and a covering ability of the paint on the metal object. If the blended amount of the acrylic cationic resin (A) is less than 20 parts by weight, a desired improvement level in weatherability of the resultant coated paint film cannot be achieved. If the blended amount of the resin (A) exceeds 70 parts by weight, the corrosion resistance of the paint composition to the flat part of the metal object (steel plate) for an automotive vehicle is insufficient.

Increasing the blended amount of the urethanated epoxy cationic resin (B) improves the corrosion resistance of the paint composition to the flat part of the metal object, a pitting resistance of the paint composition to the metal object and water resistance of the resultant coated paint film and the covering ability of the paint composition onto the metal object, but degrades the weatherability and the yellowing resistance of the resultant paint film. If the amount of the urethanated epoxy cationic resin (B) is less than 5 parts by weight, the corrosion resistance is insufficient. If the amount exceeds 50 parts by weight, the weatherability does not reach a desired value.

The blocked isocyanate hardener resin (C) makes a urethanation reaction with hydroxyl groups in the acrylic cationic resin (A) and the urethanated epoxy cationic resin (B) and cationic cross-linked resin particulate (D). In case that the concentration of the regenerated isocyanate is high, it is sufficient that the blended amount of the hardener resin (C) is less. However, if the blended amount is less than 10 parts by weight, hardening of the resultant coated paint film is insufficient thereby to degrade an overall quality of the coated paint film. If the blended amount exceeds 40 parts by weight, the stability of the paint composition is degraded while raising problems of degrading a paint stability and degrading physical properties and an adherence of the coated paint film owing to an excessive hardening of the coated paint film.

Increasing the blended amount of the cationic cross-linked resin particulate (D) improves the edge portion covering ability but degrading a smoothness (surface roughness) of the surface of the coated paint film. Thus, the blended amount of the resin particulate (D) increased within a suitable range noticeably improves the corrosion resistance to the edge portion of the metal object. However, if the blended amount exceeds 20 parts by weight, lowering in coated paint film surface smoothness leads to microscopic defects of the coated paint film such as providing a so-called porous paint film and/or a micro-pin holed paint film, thus lowering the corrosion resistance of the paint film to the metal object. If the blended amount is less than 1 parts by weight, the edge portion covering ability is insufficient.

In order to prepare the cationic electrodeposition paint composition, after the acrylic cationic resin (A), the epoxy cationic resin (B) and the hardener resin (C) are previously mixed, neutralizing a part or all the amino groups are neutralized with formic acid, acetic acid, propionic acid and/or lactic acid. Otherwise, mixing may be made after a group of the cationic resin (A) and the hardener resin (C) and a group of the cationic resin (B) and the hardener resin (C) are respectively neutralized and formed into an aqueous solution or aqueous dispersion liquid.

It will be understood that the cationic electrodeposition paint composition may include an organic solvent for the purpose of further facilitating formation of the aqueous solution or the aqueous dispersion liquid, improving the stability of the aqueous solution, the flowability of the resins and the smoothness of the coated paint film. Examples of the organic solvent are ethyl cellosolve, propyl cellosolve, butyl cellosolve, ethyl carbitol, butyl carbitol, ethyleneglycol dimethylether, diethyleneglycol dimethylether, ethylcellosolve acetate, butylcellosolve acetate, dioxane, diacetone alcohol, methylethyl kelone, isophorone, toluene and xylene.

Furthermore, the cationic electrodeposition paint composition may include a suitable pigment such as iron oxide, lead oxide, strontium chromate, carbon black, titanium dioxide, talc, aluminum silicate and barium sulfate, in which one or more pigments may be used.

Moreover, the cationic electrodeposition paint composition may include, as a catalyst for hardening the coated paint film, a metallic salt of an organic acid, such as manganese acetate, manganese lactate, cobalt acetate, cobalt lactate, lead acetate, lead octate, tin acetate and dibutyltin laurate.

In order to conduct an electrodeposition painting by using the cationic electrodeposition paint composition of the present invention, an electrodeposition voltage of 50 to 400 V is impressed for 1 to 5 minutes between the metal object (serving as a cathode) to be coated and an anode under a condition in which the total solid content of the aqueous paint composition is preferably within a range of 5 to 30% by weight, more preferably within a range from 10 to 20% by weight, more preferably within a range from 10 to 20% by weight; and a temperature of the electrodeposition paint (composition) is within a range from 20° to 35° C., thereby depositing the paint composition on the surface of the metal object. The thus deposited paint is rinsed with water and thereafter baked at 150° to 200° C. for 10 to 30 minutes in a baking furnace, thereby obtaining a dried coated paint film having a high weatherability and a high corrosion resistance to the flat surface and the edge portion of the metal object (steel plate).

Figure 1:
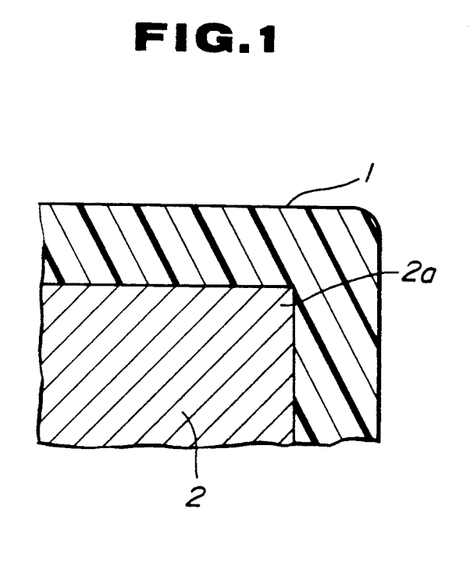
FIG. 1 is a fragmentary sectional view of an automotive vehicle wheel coated with a cationic electrodeposition paint composition in accordance with the present invention.

An example of usage of the electrodeposition paint composition of the present invention is shown in FIG. 1, in which the cationic electrodeposition paint composition 1 of the present invention is coated as a paint film on the surface of a steel plate 2 forming a road wheel of an automotive vehicle. The steel plate 2 has an edge portion 2a well covered with the paint composition or film 1.

EXPERIMENT

In order to evaluate the cationic electrodeposition paint composition of the present invention, discussion will be made on Productions and on Examples in comparison with Comparative Examples which are not within the scope of the present invention.

Production 1

Preparation of acrylic cation resin (A-1)

A clean reactor vessel equipped with a stirrer, a reflux condenser, a dropping funnel and a thermometer was supplied with 30 parts by weight of ethyleneglycol monoethylether and 10 parts by weight of isopropyl alcohol. The content in the reactor vessel was heated to 108° C. under stirring, refluxing the solvents. Into the reactor vessel, a mixture of 10 parts by weight of n-butyl acrylate, 20 parts by weight of methyl methacrylate, 10 parts by weight of 2-hydroxyethyl, 15 parts by weight of N, N-dimethylaminopropyl methacrylamide and 2 parts by weight of azobisisobutylnitrile was dropped throughout 2 hours from the dropping funnel. Thereafter, a reaction was continued for 3 hours, maintaining a refluxing condition of the solvents, thus obtaining a copolymer solution which was light yellow and transparent and had a non-volatile content of 71% by weight.

Production 2

Preparation of acrylic cationic resin (A-2)

A clearn reactor vessel equipped with a stirrer, a reflux condenser, a dropping funnel and a thermometer was supplied with 30 parts by weight of ethyleneglycol monoethylether and 10 parts by weight of isopropyl alcohol. The content in the reactor vessel was heated to 108° C. under stirring, refluxing the solvents. Into the reactor vessel, a mixture of 25 parts by weight of 2-ethylhexyl acrylate, 15 parts by weight of n-butyl methacrylate, 25 parts by weight of stylene, 20 parts by weight of 2-hydroxyethyl methacrylate, 15 parts by weight of dimethylaminoethyl methacrylate and 2 parts by weight of azobisisobutylnitrile was dropped throughout 2 hours from the dropping funnel. Thereafter, a reaction was continued for 3 hours, maintaining a refluxing condition of the solvents, thus obtaining a copolymer solution which was light yellow and transparent and had a non-volatile content of 71% by weight.

Production 3

Preparation of urethanated epoxy cationic resin (B-1)

A clean reactor vessel equipped with a stirrer, a reflux condenser and a thermometer was supplied with 355 parts by weight of ethyleneglycol monobutylether and 650 parts by weight of bisphenol A epoxy resin (having an epoxy equivalent of 650) were supplied. The content in the reactor vessel was heated at 100° C. under stirring thereby to completely dissolve the epoxy resin. Thereafter, the content in the reactor vessel was cooled to 60° C. Into the reactor vessel, 900 parts by weight of EPU-385 (trade name of Asahi Denka Kogyo Kabushiki Kaisha in Japan; urethane-modified epoxy resin having a solid content of 70% by weight and an epoxy equivalent of 900) was supplied. Thereafter, 105 parts by weight of diethanol amine and 73 parts by weight of diethylamine were added to the content in the reactor vessel. Then reaction was made in the content of the reactor vessel at 100° C. for 2 hours, thus obtaining a resionous solution which was light yellow and transparent and had a non-volatile content of 70% by weight.

Production 4

Preparation of urethanated epoxy cationic resin (B-2)

A clean (the first) reactor vessel equipped with a stirrer, a reflux consenser and a thermometer was supplied with 475 parts by weight of methylisobutyl ketone, 1900 parts by weight of bisphenol A epoxy resin having an epoxy equivalent of 475. The content in the reactor vessel was heated at 100° C. thereby completely dissolving the epoxy resin.

Another (the second) reactor vessel was supplied with 348 parts by weight of tolylene diisocyanate. Into the reactor vessel, 1000 parts by weight of Adeka Polyether P-1000 (trade name of Asahi Denka Kogyo Kabushiki Kaisha; polypropylene glycol) was gradually added, paying attention to heat generation. After completion of addition of the Adeka polyether P-1000, the temperature in the content in the reactor vessel was maintained at 60° C., in which a NCO value was measured at intervals of 1 hour. When the NCO value for the solid content reached 6.0 to 6.5%, 675 parts by weight of the content in the second reactor vessel was gradually added to the content (the epoxy resin solution) in the first reactor vessel at 100° C. under good stirring. Then reaction was made at 100° C. for 3 hours, thereby obtaining a reaction mixture.

To this reaction mixture, 1137 parts by weight of ethyleneglycol monobutylether was added. Then the reaction mixture was cooled to 60° C., and 420 parts by weight of diethanol amine was added to the reaction mixture. Reaction was made at 100° C. for 2 hours, thus obtaining a resinous solution which was light yellow and had a non-volative content of 65% by weight.

Production 5

Preparation of blocked isocyanate hardener resin (C-1)

A clean reactor vessel equipped with a stirrer, a reflux condenser, a dropping funnel and a temperature was supplied with 253 parts by weight of methylesobutyl ketone and 522 parts by weight of tolylenediisocyanate. Into the reactor vessel, 354 dropped throughout 1 hour at 30° C. under stirring, carrying out such cooling as to control the reaction mixture in the reactor vessel at temperatures from 30° to 35° C. Upon completion of dropping of the ethyleneglycol monobutylether, the reaction mixture was maintained at 40° C., in which a NCO value was measured at intervals of 1 hour. When the NCO value for the solid content reached to 14.0 to 14.5%, 134 parts by weight of trimethylol propane was heated to 90° C. throughout 1 hour. Then the NCO value was measured at intervals of 1 hour, maintaining the temperature. When the NCO value for solid content reached a level of not higher than 0.5%, 325 partgs by weight of ethyleneglycol monobutylether was added to the reaction mixture, and stirring was made for 1 hour, thus obtaining a resinous solution having a non-volatile content of 65% by weight.

Production 6

Preparation of epoxy resin derivative (d-1)

A clean 3 liter four-necked flask equipped with a thermometer, a reflux condenser and a stirrer was supplied with 950 parts by weight of bisphenol A epoxy resin having an epoxy equivalent of 475 and 588 parts of propylene glycol methylether. The content in the flask was heated at 110° C. to dissolve the epoxy resin, and

13 then cooled to 80° C. To the content in the flask, 422 parts by weight of a diketimine compound (obtained by heating 2 moles of methylethyl ketone and 1 mole of diethylene triamine to carry out dehydration condensation) were supplied. The content in the flask was maintained at 80° C. for 2 hours. Thereafter, 12 parts by weight of acetic acid and 180 parts by weight of deionized water were added to the content in the flask. Then a reaction was made at 80° C. for 1 hour, thereby obtaining a compound having four primary amino groups per one molecule and having a solid content concentration of 70% by weight.

Production 7

Preparation of polybutadiene derivative (d-2)

A flask as same as that in Production 6 was supplied with 1000 parts by weight of an epoxidated polybutadiene having an oxirane oxygen content of 6.5% and a number average molecular weight of 1800, 377 parts by weight of ethyleneglycol monobutylether and 131 parts by weight of methylethanol amine. The content in the flask was maintained at 170° C. for 6 hours under sterring in the stream of $N_2$ gas. After the content in the flask was cooled to 120° C., 81.4 parts by weight of acrylic acid, 8.8 parts by weight of hydroquinone and 27.1 parts by weight of ethyleneglycol monoethylether were added to the content in the flask. The content in the flask was maintained at 120° C. for 4 hours, thus obtaining a compound having two α, β-ethylenic unsaturated groups and having a solid content concentration of 75% by weight.

Production 8

Preparation of cationic cross-linked resin particulate (D-1)

A reactor vessel was supplied with 1428 parts by weight of the primary amino group-containing epoxy resin rivative (d-1) of Production 6 and 666 parts by weight of α, β-ethylenic unsaturated groups-containing polybutadiene derivative (d-2) of Production 7 and 406 parts by weight of ethyleneglycol monobutylether. The content in the reactor vessel was maintained at 50° C. for 1 hour. After 17.3 parts by weight of 88% formic acid was added to the content in the reactor vessel, 4983 parts by weight of deionized water at 60° C. was gradually added to the content in the reactor vessel under strong stirring. Thereafter the content in the reactor vessel was maintained at 60° C. for 3 hours, thereby obtaining an aqueous dispersion liquid of a cationic cross linked resin particulate which has a solid content concentration of 20% by weight, a cationic amine value 2.9 milli-equivalent/g(solid content), an average particle size of $0.1\mu$ and a gelation degree of 88%. The average particle size was measured by a Laser Particle Analyser System LPA-3000 produced by Otsuka Electronics Co., Ltd. in Japan. The gelation degree was a percentage of a content (insoluble to tetrahydrofuran) of a total solid content in the aqueous dispersion liquid, and measured as follows: 100 parts by weight of the aqueous dispersion liquid and 200 parts by weight of tetrahydrofuran were sufficiently mixed with each other thereby to obtain a mixture. The mixture was subjected to a centrifugal separation, in which a settled substance insoluble to tetrahydrofuran was measured to determine the gelation degree.

14

Production 9

Preparation of cationic cross-linked resin particulate (D-2)

A reactor vessel was supplied with 1071 parts by weight of the epoxy resin derivative (d-1) and 1000 parts by weight of the polybutadiene derivative (d-2) and 17.3 parts by weight of 88% formic acid. Subsequently, 4983 parts by weight of deionized water was gradually added to the content in the reactor vessel under strong stirring. Thereafter, the content in the reactor vessel as maintained at 60° C. for 3 hours, thus obtaining an aqueous dispersion liquid of a cationic cross-linked resin particulate having a solid content concentration of 20% by weight, an average particle size of $0.08\mu$ and a gelation degree of 91%.

Production 10

Preparation of resin for dispersing pigment

A clean reactor vessel equipped with a thermometer, a reflux condenser, a vacuum distillation device and a stirrer was supplied with 714 parts by weight of methylisobutyl ketone (MIBK), 950 parts by weight of bis A epoxy resin having an epoxy equivalent of 475 and 1264 parts by weight of polypropylene diglycidylether epoxy resin. The content in the reactor vessel was heated at 60° under stirring to be homogeneously dissolved, thus obtaining an epoxy resin-dissolved solution.

A separate reactor vessel was supplied with 248 parts by weight of MIBK, 113 parts by weight of ε-caprolactam and 348 parts by weight of tolulene diisocyanate. The content in the reactor vessel was heated under stirring to be maintained at 50° C. Since a time point upon lapse of 1 hour, the NCO value was measured. When the NCO value for the solid content reached 27 to 29%, the content in the reactor vessel was cooled to 30° C. To the content in the reactor vessel, 118 parts by weight of ethyleneglycol monobutylether was dropped, and the content was maintained at 40° C. thus obtaining a reaction product having a NCO value of 18 to 19%.

This reaction product was gradually added in an amount of 620 parts by weight to the above-mentioned epoxy resin-dissolved solution in the reactor vessel under good stirring, and maintained at 80° C. for 2 hours. Thereafter, to this content in the reactor vessel, 210 parts by weight of diethanol amine, 610 parts by weight of a diamine compound which was a reaction product between 1 mole of hexamethylene diamine and 2 moles of "Cardura E-10" (trade name of Shell Kagaku K.K. in Japan), and 130 parts by weight of diethylamino propylamine were added. Then the content in the reactor vessel was maintained at 80° C. for 3 hours. Thereafter, 810 parts by weight of MIBK was removed at a temperature of the liquid from 80° to 90° C. under a vacuum of 50 mmHg in the reaction vessel. Lastly, 810 parts by weight of ethyleneglycol monoethylether was added to the content of the reactor vessel, thus obtaining a resin for pigment dispersion, having a solid content concentration of 80% by weight.

| Preparation of pigment-dispersed liquids (E-1) and (E-2 (black)) | |
|---|---|
| Ingredient | Part by weight |
| Raw materials for the liquid (E-1) | |
| The pigment dispersing resin | 12.5 |

-continued

| Preparation of pigment-dispersed liquids (E-1) and (E-2 (black)) | |
|---|---|
| Ingredient | Part by weight |
| in Production 10 | |
| 90% acetic acid | 6.7 |
| Deionized water | 26.3 |
| Carbon black | 0.5 |
| Titanium oxide | 20.0 |
| Kaolin | 5.0 |
| Basic lead silicate | 2.0 |
| Dibutyltinoxide | 1.0 |
| Raw materials for the liquid (E-2) | |
| The pigment dispersing resin in Production 10 | 12.5 |
| 90% acetic acid | 6.7 |
| Deionized water | 26.3 |
| Carbon black | 2.0 |
| Titanium oxide | — |
| Kaolin | 16.0 |
| Basic lead silicate | 2.0 |
| Dibutyltinoxide | 1.0 |

Preparation

The pigment dispersing resin in Production 10 was supplied into a premixing tank equipped with a stirrer, and neutralized with acetic acid and diluted with deionized water. Subsequently, the carbon black, (the titanium oxide), the kaolin, the basic lead silicate and the dibutyltin oxide were supplied in the above-mentioned amounts into the premixing tank. The mixture in the premixing tank was vigorously stirred to be previously dispersed. Thereafter, a sufficient dispersion was made by a neograin mill dispersing device, thus obtaining a pigment-dispersed liquid having a solid content concentration of 52% by weight.

EXAMPLES 1 to 7 and COMPARATIVE EXAMPLES 1 to 5

A variety of cationic electrodeposition paint compositions of examples 1 to 7 and Comparative Examples 1 to 5 were prepared by mixing the above-discussed acrylic cationic resins (A-1) and (A-2), urethanated epoxy cationic resins (B-1) and (B-2), a blocked isocyanate hardener resin (C-1), cationic cross-linked resin particulates (D-1) and (D-2), pigment-dispersed liquids (E-1) and (E-2) as shown in Table 1.

EVALUATION TEST

An electrically conductive object (steel plate) to be coated was dipped in an electrodeposition bath (temperature: 28° C.) containing each of the above-mentioned cationic electrodeposition paint compositions of Examples 1 to 7 and Comparative Examples 1 to 5 to accomplish an electrodeposition painting which was conducted according to a painting method discussed below, in which electric current at a voltage to obtain a coated film having a thickness of 20 μm upon baking was passed for 3 minutes between the object (serving as a cathode) and an anode. The thus obtained coated film corresponding to each of Examples and Comparative Examples was subjected to evaluation tests according to testing method discussed below thereby to evaluate the characters and performances of the coated paint film. The results of the evaluation tests are shown in Table 1.

Painting method

The electrodeposition paint composition of each of Examples 1 to 7 and Comparative Examples 1 to 5 was supplied to a bath made of vinyl chloride. The object (mentioned below) to be coated wad dipped in the electrodeposition paint in the bath to serve as a cathode, providing an anode dipped in the paint. Then, a cationic electrodeposition was conducted upon passing electric current at a predetermined voltage between the object and the anode. After completion of the electrodeposition, the coated object was baked under a condition mentioned below to obtain a coated paint film which was hardened, thus preparing a specimen to be subjected to the evaluation tests.

The object to be coated: (1) A steel plate (SPCC according to Japanese Industrial Standard G3141) having dimensions of 150 mm×70 mm×0.8 mm; and (2) A steel cutter knife blade which had been treated with zinc phosphate before the electrodeposition painting.

The baking condition: 170° C. and 20 minutes

Testing method for Evaluation test (1) Corrosion resistance

A salt water spraying test according to Japanese Industrial Standard Z2371 was conducted on each specimen obtained in accordance with the above painting method. Regarding the specimen of the SPCC steel plate, the salt water spraying test was carried out for 1000 hours after a cut is formed on the surface of the coated paint film by a cutter knife in a manner to reach the steel plate. Then, the degree of production of red rust was observed to evaluate a corrosion resistance of the coated paint film to the steel plate. Regarding the specimen of the cutter knife blade, the salt water spraying test was carried out for 168. Then, the degree of production of red rust was observed to evaluate a corrosion resistance of the coated paint film to the steel plate. Evaluation of the corrosion resistance is shown in Table 1.

Weatherability test

An accelerated weatherability test according to Japanese Industrial Standard D0205 was conducted for 100 hours on the specimen obtained in accordance with the above painting method. After the accelerated weatherability test, the degree of chalking of the surface of the coated paint film was observed to evaluate the weatherability of the specimen. Evaluation of the weatherability is shown in Table 1.

TABLE 1

| | Acrylic cationic resin (A) | | Urethanated epoxy cationic resin (B) | | Blocked isocyanate hardener resin (C) | | Cationic cross-linked resin particulate (D) | | Pigment-dispersed liquid | Corrosion resistance | | Weatherability |
|---|---|---|---|---|---|---|---|---|---|---|---|---|
| | Kind | Blended amount[a] | Kind | Blended amount[a] | Kind | Blended amount[a] | Kind | Blended amount[a] | | Steel plate | Knife blade | |
| Example 1 | A-1 | 50 | B-1 | 20 | C-1 | 20 | D-1 | 10 | E-1 | Good | Good | Good |
| Example 2 | A-1 | 50 | B-2 | 20 | C-1 | 20 | D-1 | 10 | E-1 | Good | Good | Good |
| Example 3 | A-1 | 50 | B-1 | 20 | C-1 | 20 | D-2 | 10 | E-1 | Good | Good | Good |
| Example 4 | A-2 | 50 | B-1 | 20 | C-1 | 20 | D-2 | 10 | E-1 | Good | Good | Good |
| Example 5 | A-1 | 50 | B-1 | 20 | C-1 | 20 | D-1 | 10 | E-2 | Good | Good | Good |

TABLE 1-continued

| | Acrylic cationic resin (A) | | Urethanated epoxy cationic resin (B) | | Blocked iso-cyanate hardener resin (C) | | Cationic cross-linked resin particulate (D) | | Pigment-dispersed liquid | Corrosion resistance | | Weather-ability |
|---|---|---|---|---|---|---|---|---|---|---|---|---|
| | Kind | Blended amount[a] | Kind | Blended amount[a] | Kind | Blended amount[a] | Kind | Blended amount[a] | | Steel plate | Knife blade | |
| Example 6 | A-1 | 40 | B-1 | 30 | C-1 | 20 | D-1 | 10 | E-2 | Good | Good | Good |
| Example 7 | A-1 | 40 | B-1 | 30 | C-1 | 25 | D-1 | 5 | E-1 | Good | Good | Good |
| Comparative Example 1 | A-1 | 30 | B-1 | 40 | C-1 | 20 | D-1 | 10 | E-1 | Good | Good | Not Good |
| Comparative Example 2 | A-1 | 65 | B-1 | 5 | C-1 | 20 | D-1 | 10 | E-1 | Bad | Good | Good |
| Comparative Example 3 | A-1 | 55 | B-2 | 25 | C-1 | 20 | — | — | E-1 | Good | Bad | Good |
| Comparative Example 4 | A-1 | 35 | B-1 | 45 | C-1 | 20 | — | — | E-1 | Good | Bad | Not Good |
| Comparative Example 5 | — | — | B-1 | 70 | C-1 | 20 | D-1 | 10 | E-1 | Good | Good | Bad |

Note: [a]Parts by weight relative to 100 parts by weight of a total solid content of (A), (B), (C) and (D).

What is claimed is:

1. A cationic electrodeposition paint composition comprising:
   an acrylic cationic resin (A) which is a copolymer of a first vinyl monomer having at least one of secondary and tertiary amino groups, a second vinyl monomer having a hydroxyl group, and a third vinyl monomer other than said first and second vinyl monomers;
   a urethanated epoxy cationic resin (B) which is a reaction product between a urethanated epoxy resin and at least one of primary and secondary amines;
   a hardener resin (C) of a blocked isocyanate which regenerates isocyanate group, by its thermal decomposition under heating; and
   a cationic cross-linked resin particulate (D) which is an addition reaction product between an epoxy resin derivative (d-1) having not less than two primary amines in one molecule and a polybutadiene derivative (d-2) having not less than two $\alpha, \beta$-ethylenic unsaturated groups in a molecule, said resin particulate having an average particle size ranging from $0.01\mu$ to $1\mu$;
   wherein said acrylic cationic resin (A) is in an amount ranging from 20 to 70 parts by weight relative to 100 parts by weight of a total solid content of said acrylic cationic resin (A), said urethanated epoxy cationic resin (B), said blocked isocyanate hardener resin (C) and said cationic cross-linked resin particulate (D); said urethanated epoxy cationic resin (B) is in an amount ranging from 5 to 50 parts by weight relative to 100 parts by weight of said total solid content; said hardener resin (C) is in an amount ranging from 10 to 40 parts by weight relative to 100 parts by weight of said total solid content; and said cationic cross-linked resin particulate (D) is in an amount ranging from 1 to 20 parts by weight relative to 100 parts by weight of said total solid content.

2. A cationic electrodeposition paint composition as claimed in claim 1, wherein said first vinyl monomer for said acrylic cationic resin (A) is at least one selected from the group consisting of dimethyl aminoethyl (meth)acrylate, diethyl aminoethyl (meth)acrylate, dimethyl aminopropyl (meth)acrylate, diethyl aminopropyl (meth)acrylate, N dimethyl aminoethyl (meth)acrylamide, N-diethyl aminoethyl (meth)acrylamide, N-dimethyl aminopropyl (meth)acrylamide and N-diethyl aminopropyl (meth)acrylamide, t-butyl aminoethyl (meth)acrylate, t-butyl aminopropyl (meth)acrylate, aziridinyl ethyl (meth)acrylate, pyrrolidinyl ethyl (meth)acrylate, and piperidinyl ethyl (meth)acrylate.

3. A cationic electrodeposition paint composition as claimed in claim 1, wherein said first vinyl monomer for said acrylic cationic resin (A) is in an amount ranging from 5 to 40 parts by weight relative to 100 parts by weight of total of said first, second and third vinyl monomers.

4. A cationic electrodeposition paint composition as claimed in claim 1, wherein said second vinyl monomer for said acrylic cationic resin (A) is at least one hydroxyl group-containing (meth)acrylate ester.

5. A cationic electrodeposition paint composition as claimed in claim 1, wherein said second vinyl monomer for said acrylic cationic resin (A) is at least one selected from the group consisting of 2-hydroxyethyl (meth)acrylate, 2-hydroxypropyl (meth)acrylate, 2-hydroxybutyl (meth)acrylate, and 4-hydroxybutyl (meth)acrylate.

6. A cationic electrodeposition paint composition as claimed in claim 1, wherein said second vinyl monomer for said acrylic cationic resin (A) is in an amount ranging from 5 to 50 parts by weight relative to 100 parts by weight of total of said first, second and third vinyl monomers.

7. A cationic electrodeposition paint composition as claimed in claim 1, wherein said third monomer for said acrylic cationic resin (A) is at least one selected from the group consisting of methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethylhexyl (meth)acrylate, lauryl (meth)acrylate, cyclohexyl (meth)acrylate, benzyl (meth)acrylate, (meth)acrylamide, N, N-dimethyl (meth)acrylamide, N-alkoxymethyl, (meth)acrylamide, vinyl toluene, and -methyl styrene.

8. A cationic electrodeposition paint composition as claimed in claim 1, wherein said urethanated epoxy resin for said urethanated epoxy cationic resin (B) is a reaction product between an epoxy and a urethane resin prepolymer having isocyanate groups.

9. A cationic electrodeposition paint composition as claimed in claim 8, wherein said urethane prepolymer is a reaction product between a diol and a diisocyanate.

10. A cationic electrodeposition paint composition as claimed in claim 9, wherein said diol is at least one selected from the group consisting.. of ethylene glycol, propylene glycol other than said diethylene glycol, diethylene glycol, tripropylene glycol, polyethylene glycol, polypropylene glycol other than said tripropylene glycol, bis (4'-hydroxyphenyl) methane, 1, 1-bis (4'-hydroxyphenyl) ethane, 2, 2-bis (4'-hydroxyphenyl) propane, cresol, resorcinol, bis (4'-hydroxycyclohexyl) methane, and 1, 1-bis (4'-hydroxycyclohexyl) ethane.

11. A cationic electrodeposition paint composition as claimed in claim 5, wherein said diisocyanate is at least one selected from the group consisting of tetramethylene diisocyanate, hexamethylene diisocyanate, 1, 4-cyclohexane diisocyanate, isophorone diisocyanate, m-phenylene diisocyanate, 4, 4-diphenylmethane diisocyanate, and 2, 4- and 2, 6-tolylene diisocyanate.

12. A cationic electrodeposition paint composition as claimed in claim 8, wherein said epoxy resin is at least one selected from the group consisting of an epoxy resin having 1.5 to 3.0 epoxy groups and not less than 2 hydroxyl groups per one molecule, aliphatic epoxy resin, novolak epoxy resin, and polyalkylene glycol epoxy resin.

13. A cationic electrodeposition paint composition as claimed in claim 8, wherein said epoxy resin is a polyglycidyl ether of a polyphenol.

14. A cationic electrodeposition paint composition as claimed in claim 13, wherein said polyphenol is at least one selected from the group consisting of bis (4'-hydroxyphenyl) methane, 1, 1-bis (4-hydroxyphenyl) ethane, 2, 2-bis (4-hydroxyphenyl) propane, 4-dihydroxy benzophenone, and 1, 5-dihydroxy naphthalene.

15. A cationic electrodeposition paint composition as claimed in claim 1, wherein said amines are selected from the group consisting of diethyl amine, dibutyl amine, diisopropyl amine, di-n-propyl amine, diethanol amine, diisopropanol amine, methylethanol amine, dimethyl aminopropyl amine, diethyl aminoethyl amine, diethyl aminopropyl amine, monomethyl aminoethyl amine, hexamethylene diamine, tetramethylene triamine, tetraethylene triamine, piperidine, and morpholine.

16. A cationic electrodeposition paint composition as claimed in claim 1, wherein said blocked isocyanate hardener resin (C) is a reaction product between an organic polyisocyanate and a blocking agent.

17. A cationic electrodeposition paint composition as claimed in claim 10, wherein said organic polyisocyanate is at least one selected from the group consisting of trimethylene diisocyanate, tetramethylene, diisocyanate, hexamethylene diisocyanate, 1,4-cyclohexane diisocyanate, 1, 2-cyclohexane diisocyanate, isophorone diisocyanate, m-phenylene diisocyanate, 1, 4-naphthalene diisocyanate, 4, 4-diphenylmethane diisocyanate, 2, 4- and 2, 6-tolylene diisocyanate, 4, 4'-toluidine diisocyanate, 1, 4 -xylylene diisocyanate, dianisidine diisocyanate, 4, 4-diphenylether diisocyanate, chloro-diphenylene diisocyanate, triphenylmethane-4, 4', 4''-triisocyanate, 1, 3, 5-triisocyanate benzene, 2, 4, 6-triisocyanate toluene, 4, 4'-diphenyldimethylmethane-2, 2'-5', 5'-tetraisocyanate, dimers and trimers of the above-mentioned diisocyanates, and a prepolymer derived from a polyol which reacts with isocyanates to provide an isocyanate-terminated prepolymer.

18. A cationic electrodeposition paint composition as claimed in claim 16, wherein said blocking agent is at least one selected from the group consisting of methyl alcohol, ethyl alcohol, chloroethyl alcohol, propyl alcohol, butyl alcohol, amyl alcohol, hexyl alcohol, heptyl alcohol, octyl alcohol, nonyl alcohol, 3, 3, 5-trimethyl hexanol, decyl alcohol, lauryl alcohol, phenylcarbinol, methylphenylcarbinol, 2-hydroxyethyl acrylate, 2-hydroxyethyl methacrylate, N, N-dimethylethanol amine, N, N-diethylethanol amine, methylethyl ketone oxime, acetone oxime, cyclohexanone oxime, and ε-caprolactam.

19. A cationic electrodeposition paint composition as claimed in claim 1, wherein said epoxy resin derivative (d-1) for said cationic cross-linked resin particulate (D) is produced by a method including the steps of conducting a dehydration condensation reaction made between an amine compound having not less than one secondary amine and not less than one primary amine per one molecule, and a ketone compound to produce ketimine compound; conducting an addition reaction between said ketimine compound and an epoxy resin to produce a reaction product; and conducting a hydrolysis of said reaction product to regenerate primary amine group.

20. A cationic electrodeposition paint composition as claimed in claim 19, wherein said amine compound is at least one selected from the group consisting of monomethyl aminoethyl amine, monoethyl aminoethyl amine, monomethyl aminopropyl amine, monoethyl aminopropyl amine, diethylene triamine, dibutylene triamine, and triethylene triamine.

21. A cationic electrodeposition paint composition as claimed in claim 19, wherein said ketone compound is at least one selected from the group consisting of acetone, methylethyl ketone, methylisobutyl ketone, methylpropyl ketone and cyclohexanone.

22. A cationic electrodeposition paint composition as claimed in claim 1, wherein said polybutadiene derivative (d-2) for said cationic cross-linked resin particulate (D) is a derivative derived from an epoxidated polybutadiene which has a number average molecular weight ranging from 500 to 10000, an iodine value ranging from 50 to 500, a content of oxirane oxygen ranging from 3 to 12% by weight.

23. A cationic electrodeposition paint composition as claimed in claim 1, further comprising an organic solvent which is at least one selected from the group consisting of ethyl cellosolve, propyl cellosolve, butyl cellosolve, ethyl carbitol, butyl carbitol, ethyleneglycol dimethylether, diethyleneglycol dimethylether, ethylcellosolve acetate, butylcellosolve acetate, dioxane, diacetone alcohol, methylethyl ketone, methylisobutyl ketone, isophorone, toluene, and xylene.

24. A cationic electrodeposition paint composition as claimed in claim 1, further comprising a pigment which is at least one selected from the group consisting of iron oxide, lead oxide, strontium chromate, carbon black, titanium dioxide, talc, aluminum silicate and barium sulfate.

25. A cationic electrodeposition paint composition as claimed in claim 1, further comprising a metallic salt of organic acid is at least one selected from the group consisting of manganese acetate, manganese lactate, cobalt acetate, cobalt lactate, lead acetate, lead octate, tin acetate, and dibutyltin laurate.

* * * * *

UNITED STATES PATENT AND TRADEMARK OFFICE
CERTIFICATE OF CORRECTION

PATENT NO. : 5,164,430
DATED : 11/17/92
INVENTOR(S) : Hattori et al

It is certified that error appears in the above-identified patent and that said Letters Patent is hereby corrected as shown below:

ON THE TITLE PAGE:

Item [73] Assignee: should read as follows:

--Nissan Motor Co., Ltd., Yokohama City, Japan and Shinto Paint Co., Ltd., Amagaski, Japan--.

Before item [57] Abstract, insert the following:

--Attorney, Agent or Firm-Pennie & Edmonds--.

Column 17, Claim 1, line 33, replace "group ," with --group--.
Column 18, Claim 7, line 54, after "N-alkoxymethyl" delete --,--.
Column 18, Claim 10, line 66, delete both of the "..".
Column 18, Claim 10, line 67, after "glycol" delete --other than said diethylene glycol--.
Column 19, Claim 10, line 1, after "glycol" insert --other than said diethylene glycol--.
Column 19, Claim 17, line 45, after "tetramethylene" delete --,--.

Signed and Sealed this

Sixth Day of April, 1993

Attest:

STEPHEN G. KUNIN

*Attesting Officer*     *Acting Commissioner of Patents and Trademarks*